March 12, 1968        G. A. GADBOIS        3,373,405

FOUR-CHANNEL TELEMETRY CIRCUIT

Filed Aug. 19, 1964        3 Sheets-Sheet 1

INVENTOR
George A. Gadbois

BY

ATTORNEY

INVENTOR
George A. Gadbois
BY
ATTORNEY

United States Patent Office 3,373,405
Patented Mar. 12, 1968

3,373,405
FOUR-CHANNEL TELEMETRY CIRCUIT
George A. Gadbois, Silver Spring, Md., assignor to the United States of America as represented by the Secretary of the Navy
Filed Aug. 19, 1964, Ser. No. 390,767
8 Claims. (Cl. 340—147)

The invention described herein may be manufactured and used by or for the Government of the United States of America for governmental purposes without the payment of any royalties thereon or therefor.

The present invention is directed generally to a multichannel telemetry system for continuously sampling temperature and pressure and more particularly to a commutating system for use in a meteorological radiosonde set for measuring the atomspheric temperature and pressure continuously from an altitude of 200,000 feet.

Systems for sampling and commutating pressure and temperature information are generally well known. Commutation apparatus of these prior art systems used to sample temperature and pressure includes rotary driven motors, stepping switches and the like to provide continuous sampling of temperature and pressure at either different locations or different points in time or both. The bulky electro-mechanical devices common to these types of systems not only possess the disadvantage of speed in operation, but in addition normally present a space problem where the allowable space for storing these systems is at a minimum.

The present invention includes a novel combination of solid state electronic components forming a multi-channel telemetry system which does not possess the aforedescribed disadvantages of prior art systems. The invention consists of a four-channel network for sampling pressure and temperature information which is subsequently transmitted from a parachute payload to a ground receiver. The parameters to be sampled include air temperature, air pressure, a reference parameter, and the wall temperature of an air pressure chamber. The system is designed to provide a higher sampling rate for the parameter having the greatest variance.

An object of the invention is to provide a multi-channel telemetry system for sampling temperature and pressure using conventional miniature electronic components in order to achieve a high density package while maintaining the manufacturing cost at a minimum.

Another object of the invention is to provide a multichannel system for continuously sampling temperature and pressure wherein the sampling sequence is designed to give the maximum amount of information during a given period for a plurality of varying parameters.

Another object is to provide a multi-channel commutation system which would yield the most complete meteorological information from a parachute payload during a flight of predetermined duration.

Other and further objects will become more fully apparent from the following description of the drawings wherein.

Figure 1:
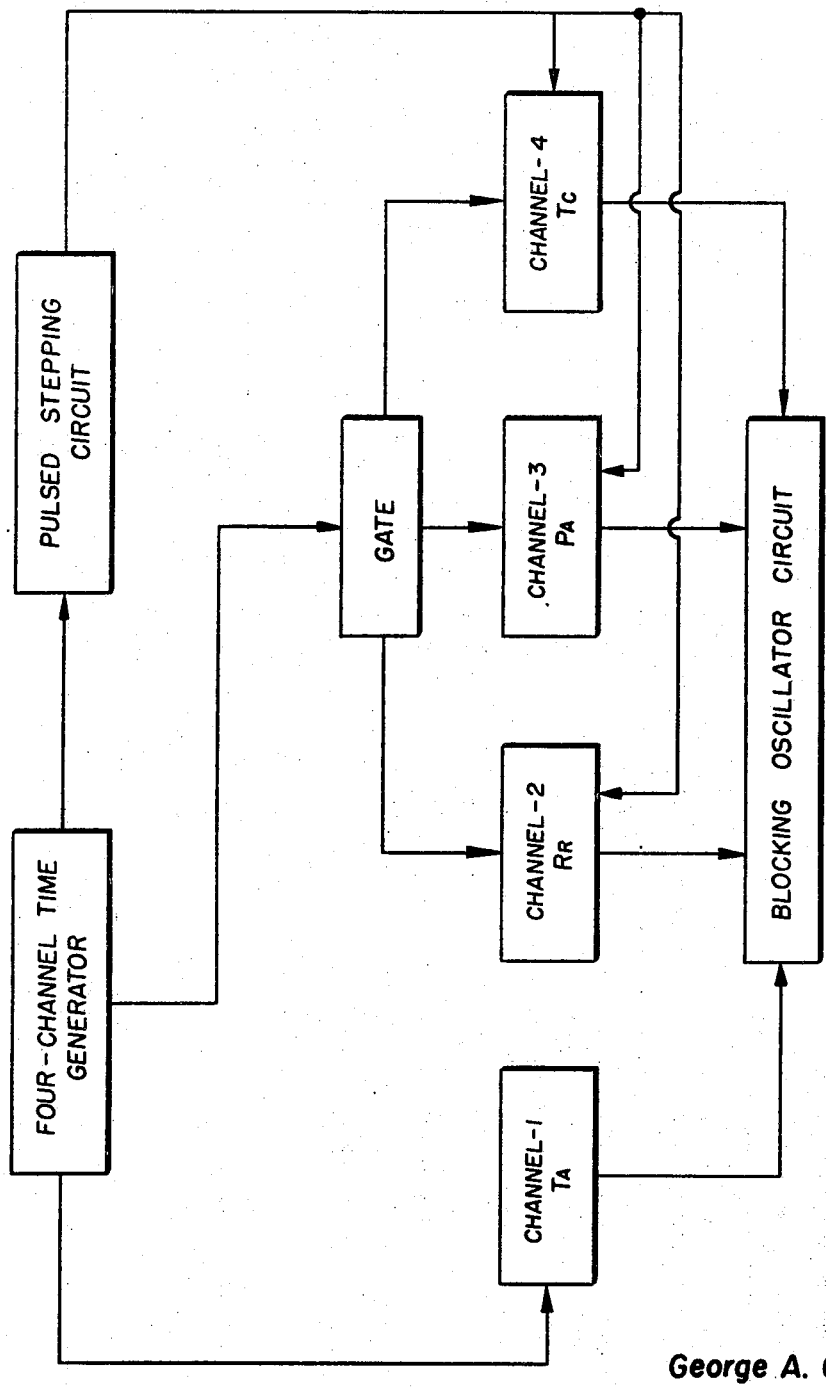
FIG. 1 is a functional block diagram of the four-channel commutating system of the present invention.

The commutation or sampling system consists of three basic functional circuits: a pulse time generator, a pulsed sequential stepper circuit, and channel switching circuit, all of which are represented functionally in the block diagram of FIG. 1.

The pulse time generator and the stepper circuit provide the driving and switching signals for the remainder of the system shown in FIG. 1 as will be described hereinafter.

Figure 2:
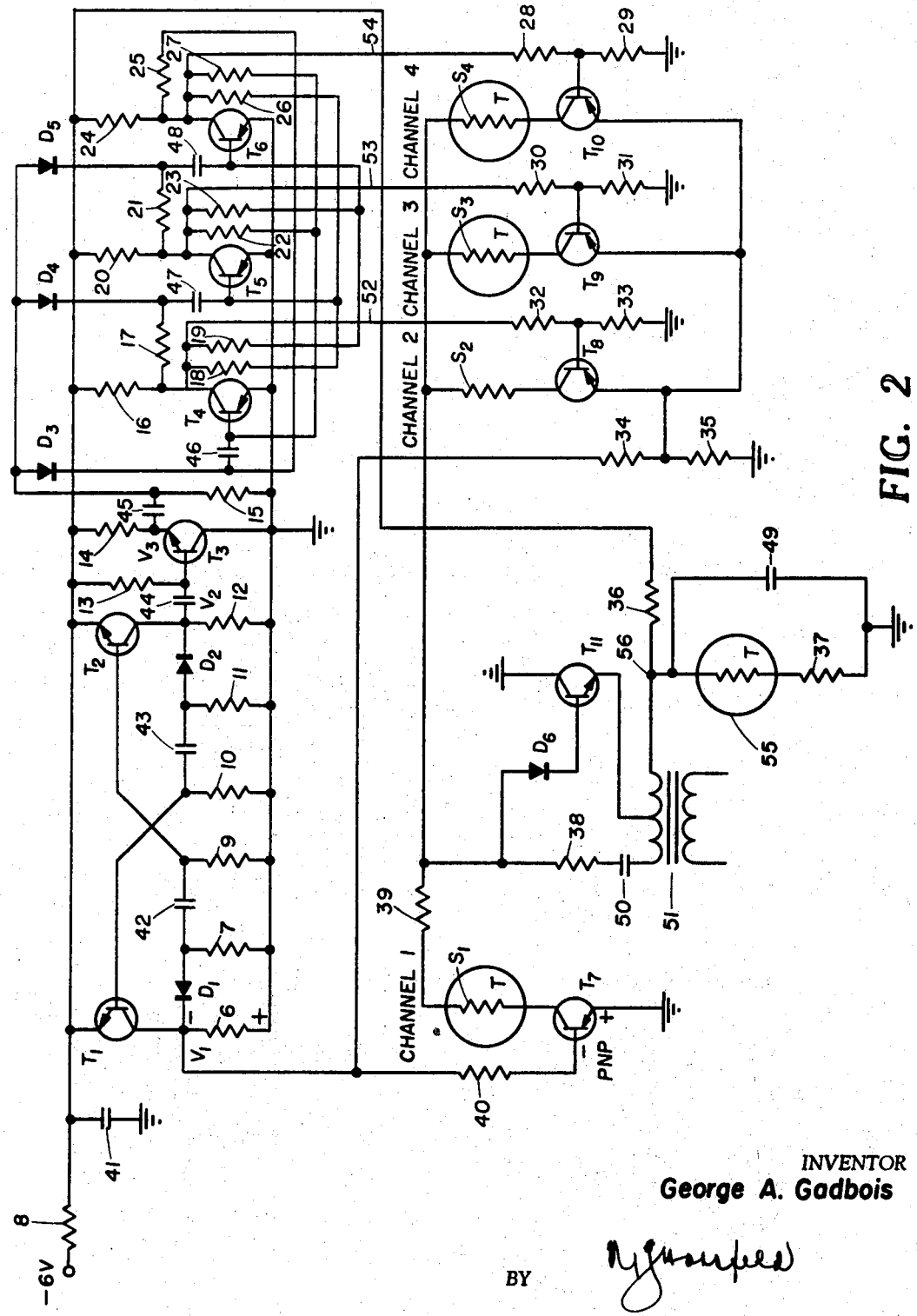
FIG. 2 is a detailed schematic diagram showing all of the electronic components of the system.

The following is a table of circuit parameter values and types for the numerical reference characters in FIG. 2.

*Table I*

Transistors:
| | |
|---|---|
| T1 | 2N2222 |
| T2 | 2N2222 |
| T3 | 2N2222 |
| T4 | 2N721 |
| T5 | 2N721 |
| T6 | 2N721 |
| T7 | 2N738 |
| T8 | 2N738 |
| T9 | 2N738 |
| T10 | 2N738 |
| T11 | 2N718 |

Diodes:
| | |
|---|---|
| D1 | IN459 |
| D2 | IN459 |
| D3 | IN659 |
| D4 | IN659 |
| D5 | IN659 |
| D6 | IN459 |

Resistors:
| | |
|---|---|
| 6 | 4.7KΩ |
| 7 | 4.7KΩ |
| 8 | 33Ω |
| 9 | 47KΩ |
| 10 | 47KΩ |
| 11 | 4.7KΩ |
| 12 | 4.7KΩ |
| 13 | 10KΩ |
| 14 | 4.7KΩ |
| 15 | 6.8KΩ |
| 16 | 1.5KΩ |
| 17 | 4.7KΩ |
| 18 | 3.3KΩ |
| 19 | 3.3KΩ |
| 20 | 1.5KΩ |
| 21 | 4.7KΩ |
| 22 | 3.3KΩ |
| 23 | 3.3KΩ |
| 24 | 1.5KΩ |
| 25 | 4.7KΩ |
| 26 | 3.3KΩ |
| 27 | 3.3KΩ |
| 28 | 27KΩ |
| 29 | 10KΩ |
| 30 | 27KΩ |
| 31 | 10KΩ |
| 32 | 27KΩ |
| 33 | 10KΩ |
| 34 | 100Ω |
| 35 | 220Ω |
| 36 | 1KΩ |
| 37 | 2.2KΩ |
| 38 | 150Ω |
| 39 | 40KΩ |
| 40 | 27KΩ |

Capacitors: Microfarads
| | |
|---|---|
| 41 | 33 |
| 42 | 68 |
| 43 | 68 |
| 44 | .01 |

TABLE I—Continued

| Capacitors: | Microfarads |
|---|---|
| 45 | .01 |
| 46 | 1500 |
| 47 | 1500 |
| 48 | 1500 |
| 49 | 22 |
| 50 | .15 |

The pulse time generator of FIG. 1 is shown in schematic form in FIG. 2 as a symmetrical free-running multivibrator including cross-coupled transistors T1 and T2 and blocking diodes D1 and D2 in each transistor collector branch for the purpose of obtaining a good square wave response. A —6 volt power supply is provided at the emitters of the two NPN transistors T1 and T2, and the outputs V1 and V2 are taken across the resistors 6 and 12 respectively. The diodes D1 and D2 are included to prevent charging currents from passing in the collector-resistance branch of each transistor since such action would degrade the voltage rise time on resistors 6 and 12. The rise time of the multivibrator is thereby limited by the transistor collector capacitance and collector load resistance.

The period during which sensor S1 in the temperature channel (channel 1) to be described more fully hereinafter is controlled by the voltage at the collector of T1 which in turn is governed by the RC network maintaining T1 conducting.

The equation which controls the conduction time of each of the transistors T1 and T2 is given by Equation 1:

$$(1) \qquad T/2 = 0.69RC$$

where T is a period of the multivibrator. Multiplying by the R.C. values of 7 and 42 and 11 and 43 which are found in Table I, $T/2$ can be shown equal to 2.2 seconds.

Figure 3:
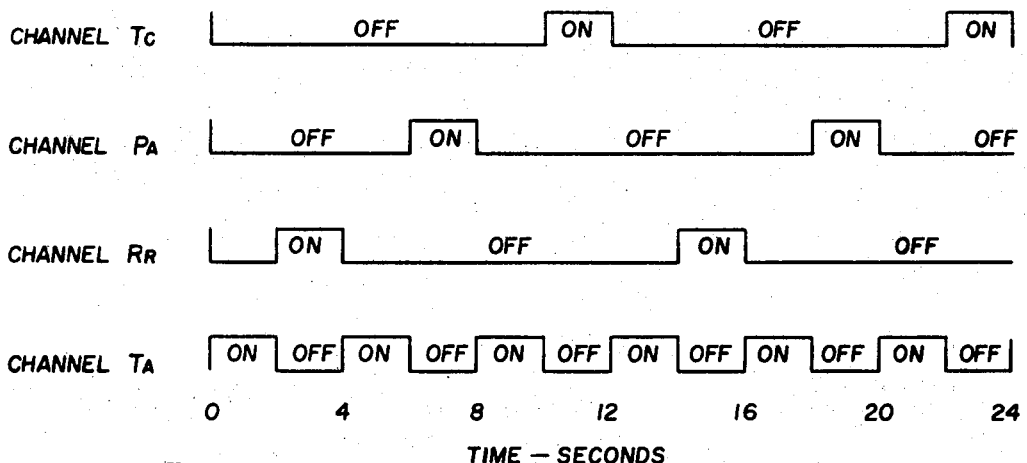
FIG. 3 is a representation of the four-channel commutation sequence to be described.
Figure 4:
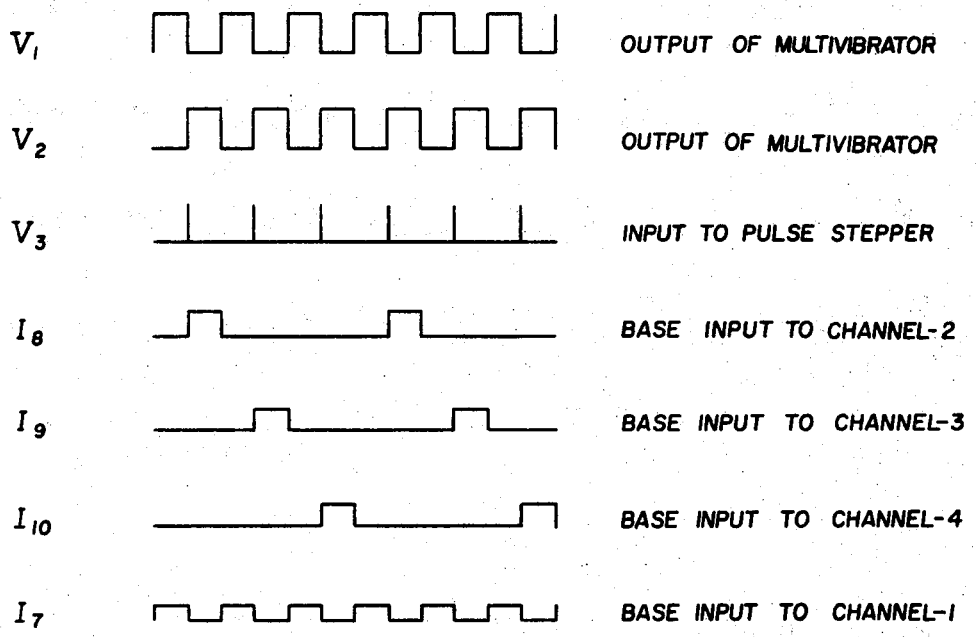
FIG. 4 is a waveform diagram of current and voltage at various points of the circuit shown in FIG. 2.

The output V2 (see FIG. 3) is applied to a transistor pulse shaping stage including transistor T3 through capacitor 44 to the base of T3. Capacitor 44 and resistor 13 form the differentiating network of the stage and the output of this stage is taken from the emitter follower resistor 14 and applied to the anodes of the diodes D3, D4 and D5 of the pulse stepping network.

The pulse stepping circuit shown in FIG. 2 and including transistors T4, T5 and T6 is similar to ring counter or shift register circuit; however, it has several unique features which make it particularly attractive for its application in the present invention.

Before describing the operation of the pulse stepper circuit it should be noted that one important feature of this circuit from the standpoint of component density is the absence of large electrolytic capacitors which are common to most storing and counting circuits. Another feature is the use of one inexpensive transistor per step as compared to circuits that use the complementary regenerative methods (two transistors connected to produce regeneration by positive feedback) or the more expensive devices such as trigistors, binistors and four layer diodes. Magnetic core circuits have been considered in selecting the device to perform the stepping function; however, these circuits require, in addition to the core material, transistors for stage isolation and amplification. In addition, magnetic cores are not particularly applicable in commutator sampling of the type performed by the present invention.

Operationally, the pulse stepping circuit performs as follows: With the —6 volt supply voltage of the network initially applied to the collector resistors of transistors T4, T5 and T6, a transient condition exists, lasting less than twenty microseconds, and is followed by a condition where one transistor is cut off and the remaining two are saturated. Initially, the collector and base voltages of transistors T4, T5 and T6 increase from zero exponentially to the —6 volt supply voltage. Since the transistors are the PNP type, this immediately results in forward biasing all the transistors T4, T5, and T6. Subsequently, the transistors are driven into saturation with the collector voltage decreasing towards zero. However, forward bias cannot be maintained since $V_{be}$ for each transistor is derived from the preceding stage through the collector emitter voltage $V_{ce}$ of the preceding transistor and its associated collector resistance. For example, $V_{be}$ of transistor T5 is derived from $V_{ce}$ of transistor T4 and resistance 18. Since the transistor parameters are not identical, one transistor will have a switching response which predominates the remaining two. The transistor that possesses the fast response will reach cutoff sooner than the other two thereby forward biasing the remaining two that are in a transient state.

Before discussing the stepping sequence a brief explanation should be given regarding steering diodes D3, D4 and D5 connected in the base circuit respectively of transistors T4, T5 and T6. It is assumed that all transients have subsided and the circuit is in a quiescent state. It is also assumed that initially T4 is cutoff and that T5 and T6 are in saturation. Since T4 is cutoff the steering diode D4 is forward biased via the resistive loop 15, 16 and 17. Diodes D3 and D5 are not forward biased since their cathodes are returned to ground via the saturated associated transistors T6 and T5, respectively. Although D3 and D5 are not backbiased, the region of zero bias presents a high dynamic impedance for pulses of amplitudes less than one volt due to the threshold voltages of the diodes. However, the diode D4 is definitely in a low dynamic impedance region and a positive input pulse applied through capacitor 45 will find less dynamic resistance through D4 and thereby reverse bias the transistor T5, driving it to cut off. This action will raise the collector voltage of T5 from ground, thereby forward biasing T4 and T6 through resistors 22 and 23 respectively. This also forward biases steering diode D5 with T5 cutoff through resistors 20, 21. This sequence is repeated for subsequent input pulses, T6 being the next transistor to be cutoff and D3 being forward biased when the collector of T6 rises to —6 volts.

When each of the transistors T4, T5 and T6 assumes a nonconducting state, the negative voltage is applied respectively through conductors 52, 53 and 54 to the bases of transistors T8, T9 and T10, respectively in the channel switching circuit. In addition to transistors T8, T9 and T10 the channel switching circuit includes transistor T7 and sensor means S1, S2, S3 and S4 connected in the respective collector circuits of the transistors.

The sequential switching action of the channel switching circuit whereby each of the four sensors are periodically connected to variable frequency oscillator will be described with reference to the outputs V1 and V2 from the multivibrator circuit and the pulses received from the pulse stepping circuit. Before describing the sequential operation of transistors T7, T8, T9 and T10 it should be observed why the particular switching sequence to be described is desired. In order to obtain the most complete meteorological information during a given period of parachute payload flight, it is desirable to sample the parameter having the greatest variance more frequently than the other parameters. Since the air temperature for a particular application of the invention has the greatest variance, it is desirable to connect sensor S1 into the out of the oscillator feedback circuit at a greater frequency than sensors S2, S3 and S4. Sensor S2 is a stable fixed resistance which provides a system reference. A fixed reference resistance is required in order to eliminate errors attributed to supply voltage variations. S3 is the air pressure sensor and S4 is the wall temperature sensor of the air pressure chamber. S3 is a heated bead thermistor located in a cylindrical chamber which has ports exiting to the atmosphere. The pressure can be obtained where the relationship of the heated bead termistor resistance and the heat transfer from the heated bead to the cylindrical wall is known. The air pressure vs. heated bead thermistor resistance is not a linear function and must be calibrated. S4 measures the wall temperature of the pressure chamber and is required in the calibration of the air pressure vs. heated bead thermistor resistance curves. The selective connection of connecting each of these variable resistance sensors into the blocking oscillator controls the oscillator frequency. The sensor resistance and capacitor 50 is the RC time constant network which controls the period of the blocking oscillator. By correlating oscillator frequency with corresponding pressure and temperature sensor resistance, the variation in temperature and pressure can be derived from given calibration curves.

Referring again to the pulse stepping circuit, a negative pulse will be transferred via conductors 52, 53 and 54 to the bases of transistors T8, T9 and T10 when T4, T5 and T6 respectively are driven to cutoff. This negative pulse applied to the bases of T8, T9 and T10 will tend to forward bias each of these transistors, thereby initiating conduction in the transistors, through the associated sensors S2, S3 and S4 and successively connecting these sensors in the oscillator feedback circuit. Following the application of a negative pulse to any one of the transistor bases in channels 2, 3 and 4, the pulse stepping circuit becomes idle for the next half cycle of the free running multivibrator T1, T2. In other words, T2 becomes cutoff and T1 conducts. Upon the conduction of T1 and the development of a forward bias on transistor T7, sensor S1 is connected into the feedback circuit of the blocking oscillator whose output frequency will vary in accordance with the variation of the impedance of sensor S1. When the free running multivibrator changes states again and T2 conducts, a different transistor of the group T4, T5 and T6 is driven to cutoff and its associated transistor in the channel switching circuit becomes conductive, switching its associated sensor into the feedback loop of the blocking oscillator until the multivibrator again changes states as described above. While channel 1 is conducting, channels 2, 3 and 4 are nonconducting since a negative voltage V1 back biases the emitters of T8, T9 and T10. This is accomplished via resistors 34 and 35.

The blocking oscillator includes NPN transistor T11, a feedback transformer 51, a diode D6 to minimize leakage, and a capacitor 50 which is part of the frequency control network along with the sensor resistance 38. The network 36, 37, 49 and 55 provides voltage regulation to the blocking oscillator over the temperature range of +25° to −60° C. Regulation is provided via sensor 55 since a reduction in voltage at 56 due to temperature variations at the supply voltage is accompanied by an increase of sensor resistance 55. In this manner the voltage at point 56 is stabilized.

Many modifications of the invention can be made by one skilled in the art without departing from the spirit and scope thereof. It should be understood that the invention is limited only by the scope of the appended claims.

I claim:

1. A plural channel telemetry circuit for sampling meteorological information in a predetermined timed sequence comprising:
   a multi-stage pulse stepping circuit,
   a pulse generating circuit connected to said pulse stepping circuit for providing the successive energization of the separate stages of said pulse stepping circuit,
   a variable frequency oscillator,
   a plurality of sensor means, each coupled between said variable frequency oscillator and a separate stage of said pulse stepping circuit,
   gating means coupled to the output of said pulse generating circuit and to said pulse stepping circuit for selectively connecting each of said sensor means to said variable frequency oscillator at a first frequency upon the initiation of conduction through each of said sensor means by pulses applied to said gating means from the individual stages in said pulse stepping circuit,
   a further sensor coupled to said oscillator and isolated from said plurality of sensor means,
   a further gating circuit interconnecting said further sensor and said pulse generating circuit for connecting said isolated sensor to said variable frequency oscillator at a second frequency which is higher than said first frequency.

2. A plural channel telemetry circuit for sampling meteorological information in a predetermined timed sequence comprising:
   a multi-stage pulse stepping circuit,
   a pulse generating circuit connected to said pulse stepping circuit for driving said pulse stepping circuit and providing successive energization of the separate stages thereof,
   variable frequency oscillator means,
   a plurality of variable impedance sensors coupled to said variable frequency oscillator means and adapted to be sequentially connected to said oscillator means for varying the frequency thereof in accordance with the impedance variations of said sensors,
   gating means coupled to said pulse generating means and to said variable impedance sensors, and
   circuit means interconnecting separate stages of said pulse stepping circuit and said gating means for initiating current conduction through said sensors in a predetermined sequence.

3. The circuit of claim 2 wherein:
   said sensors include a first variable impedance sensor adapted to be connected to and isolated from said variable frequency oscillator means at a first frequency,
   a group of variable impedance sensors constituting the remainder of said plurality of sensors each adapted to be connected to and isolated from said variable frequency oscillator means at a second frequency,
   said gating means including a first valve connected between said first variable impedance sensor and said pulse generating means for initiating conduction in said first valve at said first frequency, and
   a plurality of valves each connected respectively between each of said group of sensors, said pulse generating circuit, and successive stages of said pulse stepping circuit for initiating conduction in each of said group of sensors at a second frequency equal to the switching frequency of the individual stages in said pulse stepping circuit whereby the variable frequency oscillator means samples said first variable impedance sensor at said first frequency and further samples each of said group of variable impedance sensors at said second frequency.

4. The circuit of claim 3 wherein:
   said pulse generating means comprises a free running multivibrator having a pair of output terminals,
   said multi-stage pulse stepping circuit comprising a plurality of cascaded valves,
   a pulse shaping circuit coupling one output of said free running multivibrator to each of said stages in said pulse stepping circuit providing successive conduction in each of said valves at said second frequency, and
   circuit means coupling the other output of said multivibrator to said first valve for causing conduction therein at said first frequency.

5. The circuit of claim 4 wherein:
   said first valve is a transistor having input, output, and control electrodes, said control electrode being connected to said other output of said multivibrator and said output electrode being connected to said isolated variable impedance sensor,
   said valves in said pulse stepping circuit each comprising a transistor having input, output, and control electrodes,
   a plurality of steering diodes each connected between the output of said pulse shaping circuit and the control electrode of said transistors.

6. The circuit of claim 5 wherein said variable frequency oscillator means comprises a transistor blocking oscillator having input, output, and control electrodes,
 a variable impedance feedback network connected between a pair of said oscillator electrodes,
 said variable impedance sensors being selectively connectable in said variable impedance feedback network for varying the frequency of said variable frequency oscillator means in accordance with the variations of impedance of said sensors.

7. A plural channel telemetry circuit for sampling meteorological information in a predetermined timed sequence comprising:
 a multi-stage pulse stepping circuit having a plurality of cascaded transistors, each having input, output and control electrodes, said control electrodes of each transistor connected to one electrode of a separate diode steering gate,
 a plurality of transistor gating circuit,
 a free running transistor multivibrator having one output coupled to the other electrode of each of said diode steering gates and the other output connected to each of said transistor gating circuits,
 variable frequency oscillator means,
 variable impedance sensor means connected to each of said transistor gating circuits and selectively connectable to said variable frequency oscillator means,
 circuit means connecting each stage of said multi-stage pulse stepping circuit to each respective one of a first group of said gating circuits for selectively connecting each variable impedance sensor connected thereto to said variable frequency oscillator circuit, and
 another gating circuit isolated from said multi-stage pulse stepping circuit and coupled to and controlled solely by the pulse frequency of said multivibrator for selectively connecting an individual variable impedance sensor to said variable frequency oscillator means at the multivibrator frequency.

8. The circuit of claim 7 which further includes
 a pulse shaping circuit connected to the output of said multivibrator,
 said diode steering gates each connecting the output of said pulse shaping circuit to a respective one of said transistor control electrodes in each stage of said multi-stage pulse stepping circuit,
 said group of gating circuits being comprised of a plurality of transistors having input, output, and control electrodes, said control electrodes being connected to a respective transistor output electrode in each respective stage of said pulse stepping circuit, said input electrode being connected to one output of said multivibrator and said output electrode being connected to a variable impedance sensor, and
 said sensor and its associated transistor gating circuit being selectively connectable in said feedback network of said variable frequency oscillator.

References Cited
UNITED STATES PATENTS 3,193,781 7/1965 Martner _____ 331—112
3,194,067 7/1965 Grillo.
3,213,290 10/1965 Klein et al. _____ 307—88.5

JOHN W. CALDWELL, *Primary Examiner.*

D. J. YUSKO, *Assistant Examiner.*